United States Patent
Apte et al.

(10) Patent No.: US 9,906,370 B2
(45) Date of Patent: *Feb. 27, 2018

(54) TRUST RELATIONSHIP MANAGEMENT AMONGST RACKS IN A DATA CENTER

(71) Applicant: International Business Machines Corporation, Armonk, NY (US)

(72) Inventors: Ajay A. Apte, Austin, TX (US); John Yow-Chun Chang, Austin, TX (US); Ching-Yun Chao, Austin, TX (US); Patrick L. Davis, Pflugerville, TX (US); Rohan Gandhi, Cedar Park, TX (US); Hugh E. Hockett, Raleigh, NC (US); Yuhsuke Kaneyasu, Tokyo (JP); Lewis Lo, Toronto (CA); Matthew D. McClintock, Morrisville, NC (US); Scott C. Moonen, Holly Springs, NC (US); Ki H. Park, Cary, NC (US); Ankit Patel, Austin, TX (US); Kin Ueng, Austin, TX (US); Iqbal M. Umair, Mississauga (CA); Leonardo A. Uzcategui, Westminster, CO (US); Barbara J. Vander Weele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/942,096

(22) Filed: Nov. 16, 2015

(65) Prior Publication Data

US 2017/0141927 A1    May 18, 2017

(51) Int. Cl.
H04L 9/32    (2006.01)
H04L 29/08    (2006.01)

(52) U.S. Cl.
CPC ........ *H04L 9/3263* (2013.01); *H04L 67/1097* (2013.01); *H04L 2209/24* (2013.01); *H04L 2209/64* (2013.01)

(58) Field of Classification Search
CPC ............... H04L 9/3263; H04L 67/1097; H04L 2209/24; H04L 2209/64
See application file for complete search history.

(56) References Cited

U.S. PATENT DOCUMENTS 8,737,410 B2    5/2014  Davis et al.
8,856,308 B1    10/2014  Bollay et al.
(Continued)

OTHER PUBLICATIONS

Cunsolo et al., "GS3: a Grid Storage System with Security Features", J Grid Computing (2010) 8:391-418.*
(Continued)

*Primary Examiner* — Oleg Korsak
(74) *Attorney, Agent, or Firm* — Stosch Sabo (57) ABSTRACT

A first management node of a first rack can be registered to a shared file storage system by establishing a mutual trust relationship between the first management node and the shared file storage system. The first management node can access a plurality of respective public keys and a plurality of respective certificates of authority that are stored in the shared file storage system and associated with a plurality of respective registered management nodes. The first management node can store a public key and a certificate of authority in the shared file storage system. The first management node can form mutual trust relationships with other registered management nodes. The first management node can validate authenticity of messages received from registered management nodes of the plurality of registered management nodes using a respective public key and a respective certificate of authority associated with a respective registered management node sending a message.

15 Claims, 6 Drawing Sheets

(56) References Cited

U.S. PATENT DOCUMENTS

| | | |
|---|---|---|
| 8,924,723 B2 | 12/2014 | Chang et al. |
| 8,930,693 B2 | 1/2015 | Holt et al. |
| 8,943,319 B2 | 1/2015 | Chang et al. |
| 9,148,285 B2 | 9/2015 | Chang et al. |
| 9,160,731 B2 | 10/2015 | Chang et al. |
| 2004/0210767 A1 | 10/2004 | Sinclair et al. |
| 2005/0111668 A1 | 5/2005 | Raikar |
| 2009/0055646 A1 | 2/2009 | Sussland et al. |
| 2012/0066502 A1 | 3/2012 | Bomeman et al. |
| 2012/0257756 A1 | 10/2012 | Huang et al. |
| 2014/0317716 A1* | 10/2014 | Chao ............... H04L 63/0815 726/9 |
| 2015/0074395 A1 | 3/2015 | Chang et al. |
| 2017/0041296 A1 | 2/2017 | Ford et al. |
| 2017/0149794 A1 | 5/2017 | Linnakangas et al. |

OTHER PUBLICATIONS

Lee et al., "Traust: A Trust Negotiation-Based Authorization Service for Open Systems", SACMAT'06, Jun. 7-9, 2006, pp. 39-48.*

Mell, et al., "The NIST Definition of Cloud Computing", Recommendations of the National Institute of Standards and Technology. Special Publication 800-145, Sep. 2011. 7 pages.

* cited by examiner

TRUST RELATIONSHIP MANAGEMENT AMONGST RACKS IN A DATA CENTER

BACKGROUND

The present disclosure relates to secure communication amongst components of a network, and more specifically, to establishing trust relationships between various racks in a data center.

SUMMARY

Aspects of the present disclosure relate to a computer program product, a system, and a method for establishing a trust relationship amongst a plurality of nodes. The computer program product, system, and method can comprise registering a first management node to a shared file storage system. The registration can cause the first management node to be a trusted member of the shared file storage system. The shared file storage system can store a respective public key and a respective certificate of authority for each respective registered management node. Each respective registered management node can be associated with one or more computing devices to form a rack. The computer program product, system, and method can further comprise writing, by the first management node and to the shared file storage system, a public key and a certificate of authority of the first management node. Each registered management node can validate an authenticity of a message from a different management node of the plurality of registered management nodes using the respective public key and the respective certificate of authority of the different management node.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to establishing a trust relationship between two or more components in a network. In some embodiments, the two or more components comprise various types of servers or groups of servers communicatively coupled to one another via a local (e.g., physical) or distributed (e.g., virtual) network. However, in additional embodiments, the two or more components may be other devices, such as personal computers, mobile devices, workstations, and so on which may benefit from establishing a trust relationship with one or more similar or dissimilar components of a network.

Some embodiments of the present disclosure relate to trust relationships between two or more racks. According to the present disclosure, the term "rack" should be construed to mean a set of nodes. The nodes can comprise network components, networking devices, storage devices, servers, blades, or other components according to various embodiments of the present disclosure. Each rack can include a management node. The management node can manage the operations of the various components comprising the rack. The management node can also communicate and interact with other management nodes of other racks. Thus, a plurality of management nodes overseeing a plurality of respective racks can be communicatively coupled together to form, for example, a data center capable of improved storage, processing or other computational operations.

A data center can contain multiple racks. The multiple racks can share resources to improve the flexibility and capability of the data center. In some embodiments of the present disclosure, there is no dedicated central management entity. Some aspects of the present disclosure describe a system in which distributed management nodes can join the multiple rack system and establish mutual trust relationships with other members. Users can manage a multiple rack system from any member management node (also referred to as a registered management node herein). In addition, mutual trust relationships among member management nodes can be established on top of a mutual trust relationship between each member management node and the shared storage file system.

Thus, in some aspects of the present disclosure, a management node can register to a shared storage file system by setting up a mutual trust relationship between the management node and the shared storage file system. Subsequently, this management node can establish trust relationships among the other member management nodes by making use of the trust relationship between each member management node and the shared storage file system.

The distribution of confidential data between a plurality of components connected to one another via a physical or a virtual network can benefit from various security measures to protect the confidentiality of the data and preserve the integrity of the components. One security measure is public key infrastructure (PKI). PKI can comprise a public key, a private key, and a certificate of authority. A public key can be shared with other network components while a private key can be kept confidential to an individual network component. The public key and the private key can be related by an algorithm that is impractical to determine based on knowledge of the public key alone. The certificate of authority can be used to authenticate a public key by verifying the ownership of a public key. A certificate of authority can be, but is not limited to, a X.509 security certificate. Public-private key systems can include, but are not limited to, the Rivest, Shamir, and Adleman (RSA) public-private key cryptography system. In some cases, a security token is used in addition to, or in lieu of, other aspects of the PKI, such as a password.

Protocols for establishing trust relationships are known to one of skill in the art. For example, illustrative trust establishment protocols which can be used with the techniques discussed herein are described in more detail in U.S. patent application Ser. Nos. 13/865,692, 13/745,942, and 14/019,836. Thus, trust relationships, including the use of PKI technology, public and private keys, certificates of authority, and security tokens will not be described in further detail herein. It should be understood that advancements in trust relationships which simplify, expedite, or otherwise improve upon known methods, mechanisms, and/or protocols fall within the spirit and scope of the present disclosure.

In accordance with various embodiments of the present disclosure, a shared file storage system, also referred to simply as a file storage herein, can be distributed and shared amongst a plurality of components, such as a plurality of management nodes associated with a plurality of racks. The shared file storage system can be a distributed file system such as, but not limited to, IBM's General Parallel File System (GPFS). The shared file storage system reads and writes data in parallel where the data is accessible to multiple components of a network (also referred to as nodes herein). The shared file storage system can utilize methods, mechanisms, and protocols advantageous to said purpose such as, but not limited to, data striping (e.g., segmenting and storing consecutive data blocks across multiple physical locations), distributed locking protocols (e.g., dynamic byte-range lock tokens), and allocation mapping, among others. In some embodiments of the present disclosure, registering a component, such as a management node, to a shared file storage system includes establishing a trust relationship between the component and the shared file storage system. In some cases, the trust relationship can be established by exchanging a public key (e.g., a RSA public key) of the component with a public key of the shared file storage system.

Thus, the contents of the shared file storage system are available to all nodes registered to the shared file storage system and connected via a physical network or a virtual network. Any changes made to the shared file storage system are synchronized to each component registered to the shared file storage in approximately real time, or in predetermined intervals of time. In some cases, the shared file storage system is maintained within a dedicated storage space of each registered component of a network of components. Thus, the shared file storage system can be replicated across a plurality of components as opposed to being stored in a central location. Shared file storage systems are known in the art, and therefore, further detail regarding the design and operation of said systems will not be provided herein. It should be understood that advancements in, and improvements of, shared file storage systems fall within the spirit and scope of the present disclosure.

Some embodiments of the present disclosure relate to storing security credential information of individual components, or sets thereof, in a shared file storage system. Thus, a new component can establish trust relationships with the existing components of a network by receiving access to (i.e., by being registered to) the shared file storage system and storing the security credential information of the new component in the shared file storage system. Subsequently, in some embodiments, the existing components can initiate a trust relationship with the new component based on information stored in the shared file storage system. In some embodiments, establishing a mutual trust relationship comprises exchanging security tokens between two or more components. A first security token can be received by a first component from a second component. The first component can authenticate the first security token using the public key and/or the certificate of authority of the second component. Likewise, the first component can issue a second security token to the second component. The second security token can be validated by the second component using the public key and/or the certificate of authority of the first component. Furthermore, upon a message exchange between components, the authenticity of the message can be expeditiously validated by retrieving the security credential information in the shared file storage system, or by validating a security token sent with the message.

According to various embodiments of the present disclosure, a management node of a rack can receive hypertext transfer protocol (HTTP) requests from other management nodes associated with other racks and can use the sending management node's X.509 certificate located in a shared file storage system to validate an authenticity of the request. In alternative embodiments, a management node associated with a rack can issue security tokens to other management nodes associated with other racks using X.509 certificates. The receiving management nodes can complete a trust establishment process as a result of receiving the X.509 certificate of the sending management node. In some cases, the trust establishment can be done on demand via HTTP trust relationship establishment request messages, or the trust establishment can be done automatically upon notification of a new rack member (e.g., a management node can be notified of a new rack member by subscribing to updates from the shared file storage system). In further embodiments still, a rack or management node can rejoin a network and identify one or more changes to the shared file storage system.

Advantageously, some embodiments of the present disclosure simplify, expedite, and safeguard the trust establishment process amongst a plurality of components in a network. Specifically, some embodiments simplify the trust establishment process by automatically propagating a trust relationship throughout a network following the establishment of a first trust relationship. As a result, some aspects of the present disclosure reduce the number of messages sent and received by various components of the network. In addition, some embodiments simplify the trust establishment process by allowing offline network components to automatically establish a trust relationship with a new network component upon returning to an online state. Thus, the availability requirements typically mandated for trust establishment processes are decreased or eliminated according to various embodiments of the present disclosure.

Furthermore, some embodiments expedite the trust establishment process by requiring a system administrator to establish a single trust relationship for each new member of the shared file storage system that can automatically propagate to every registered member of the shared file storage system (i.e., establish a trust relationship between the new member and the shared file storage system). Thus, according to various embodiments, a system administrator is not required to manually establish a trust relationship between every member of the network and the new network component.

Additionally, some embodiments safeguard the trust establishment process by improving the redundancy of the system. One advantage of a shared file storage system, in some embodiments, is the decentralized and distributed nature of the storage system. That is to say, each component contains, or at least a portion of the components contain, a dedicated storage having at least a portion, and in some cases a full replica, of the data embodied therewith. Thus, in some cases, an unexpected loss of data by one component can be recovered using data contained within other components, or, alternatively, the unexpected loss of data by one component can be limited to the data stored on the single component and the data stored on the other components remains available.

Given these illustrative advantages, aspects of the present disclosure reduce the resources associated with, and the component availability requirements of, the trust establishment process. Aspects of the present disclosure further improve redundancy of the trust establishment system. Thus, in light of some of the advantages of various embodiments disclosed herein, aspects of the present disclosure can be seen to provide a scalable solution to the otherwise resource intensive process of establishing a trust relationship amongst a plurality of components in a network.

It is to be understood that the aforementioned advantages are only illustrative of some advantages occurring in some embodiments of the present disclosure. Some embodiments of the present disclosure may exhibit all, some, or none of the aforementioned advantages while remaining within the spirit and scope of the present disclosure.

It is to be understood in advance that although this disclosure includes a detailed description on cloud computing, implementation of the teachings recited herein are not limited to a cloud computing environment. Rather, various embodiments are capable of being implemented in conjunction with any other type of computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
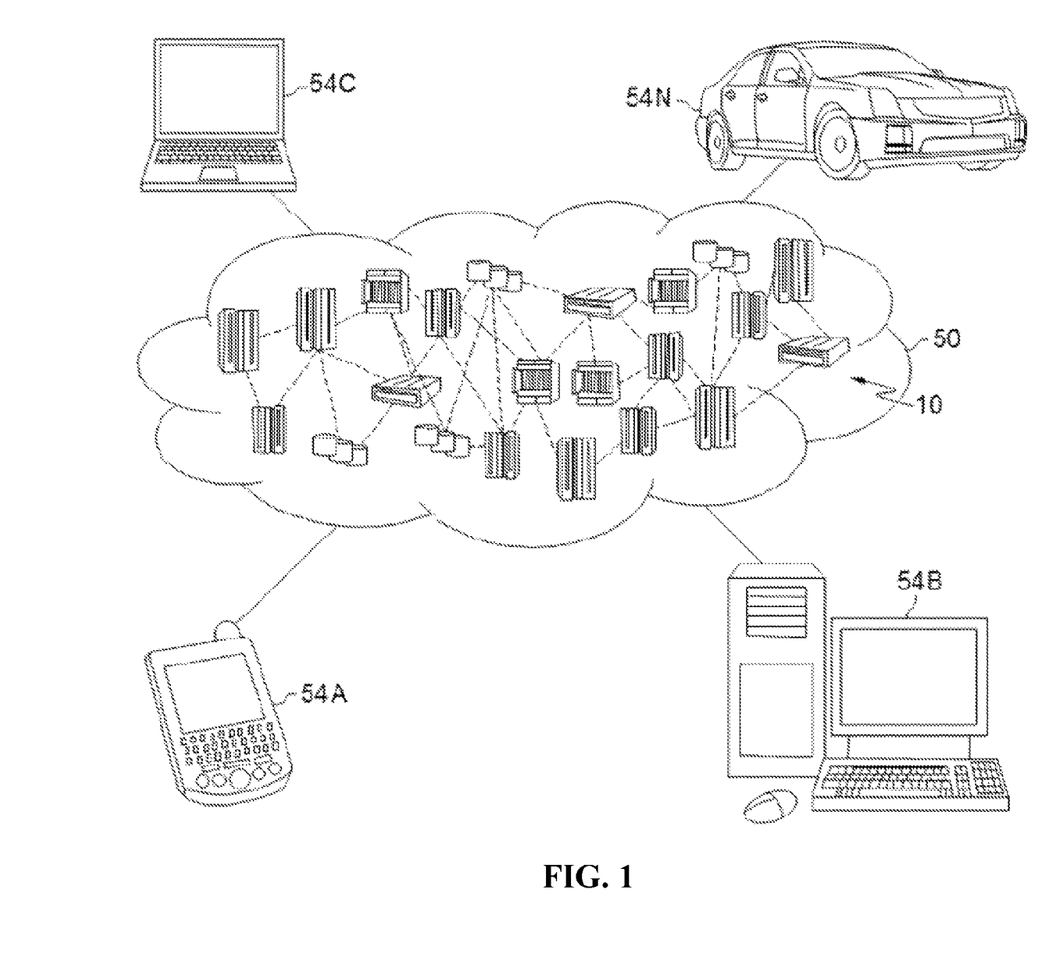
FIG. 1 depicts a cloud computing environment according to some embodiments of the present disclosure.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser). According to various embodiments of the present disclosure, the methods described hereinafter with reference to FIGS. 4-6 can be implemented by one or more cloud computing nodes 10 of FIG. 1.

Figure 2:
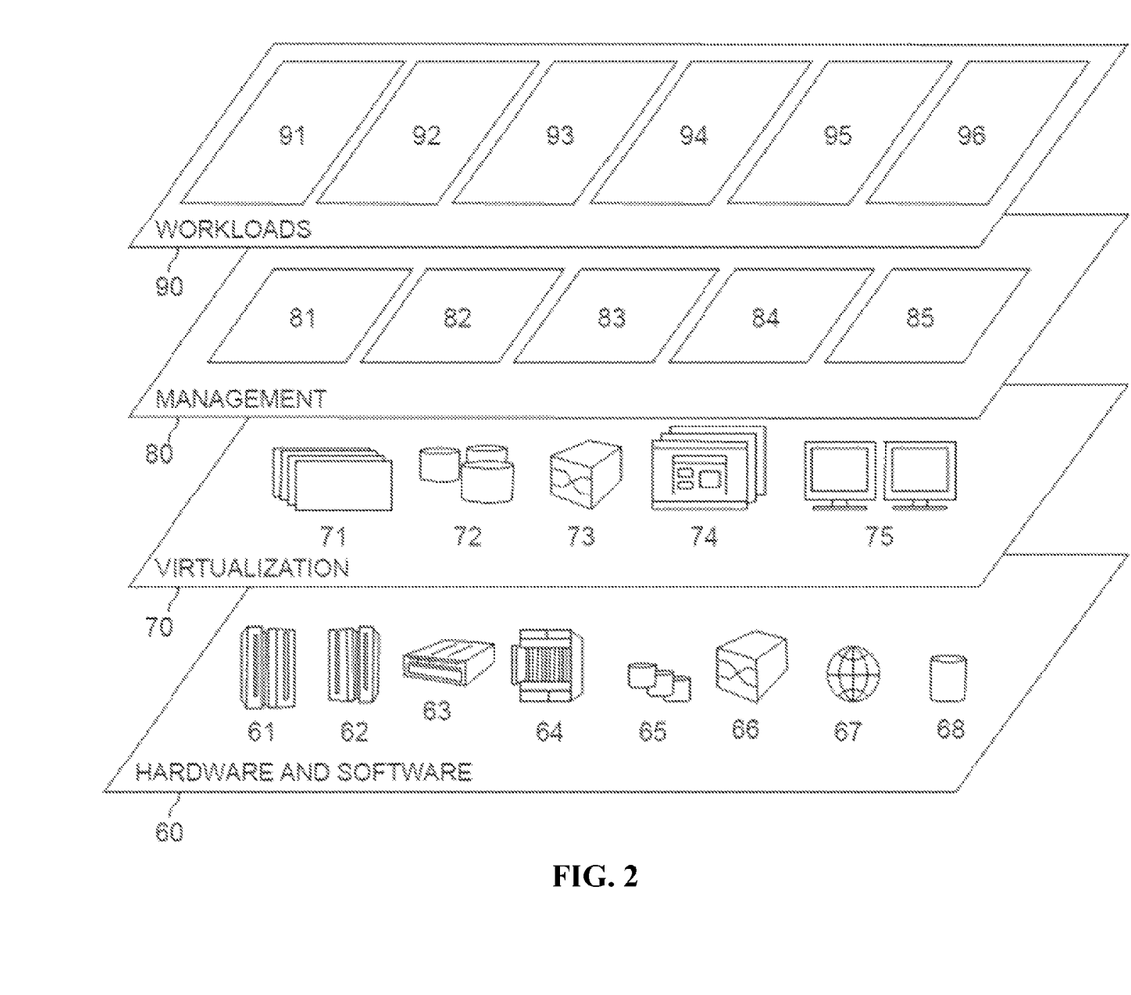
FIG. 2 depicts abstraction model layers according to some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96. According to various embodiments, the methods described hereinafter with respect to FIG. 4-6 can be implemented by one or more components appearing in hardware and software layer 60 of FIG. 2.

Figure 3:
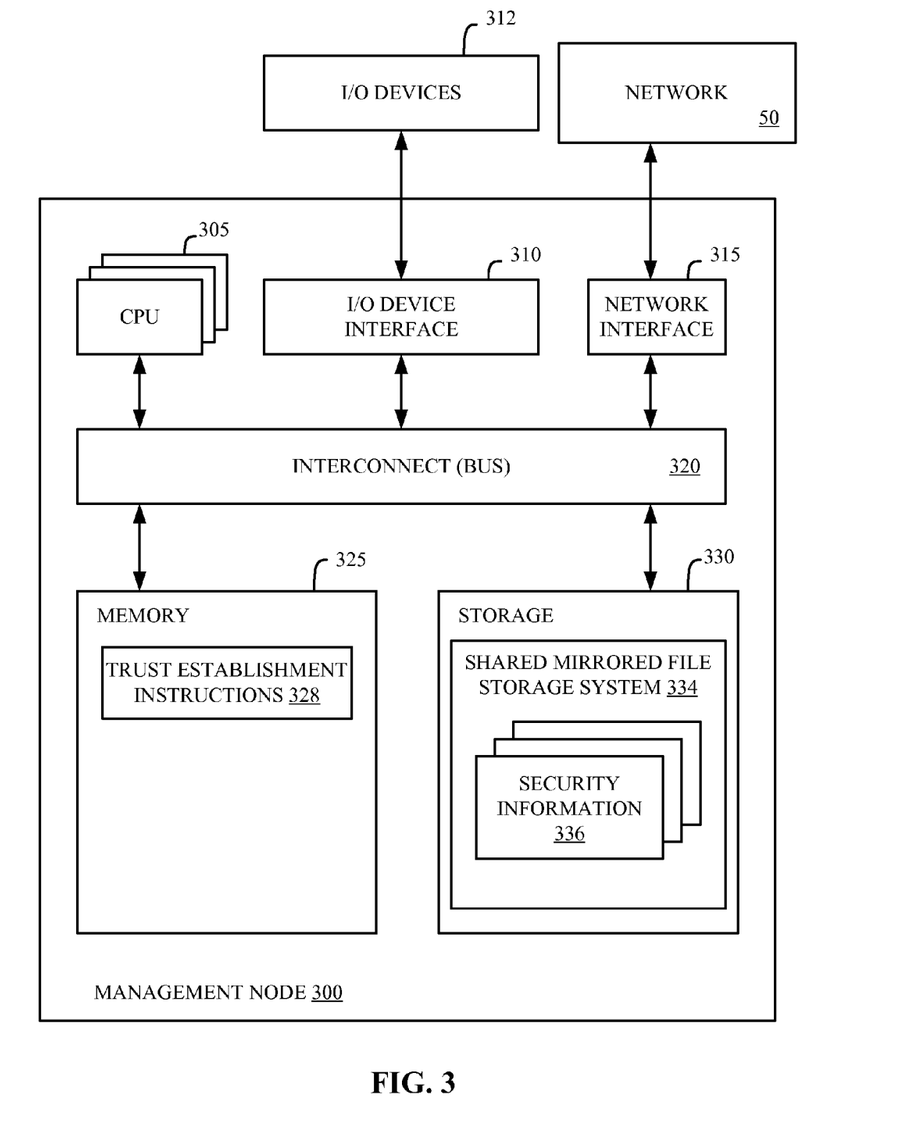
FIG. 3 illustrates a block diagram of a management node in accordance with some embodiments of the present disclosure.

Referring now to FIG. 3, shown is a block diagram of a management node according to some embodiments of the present disclosure. In some embodiments, the management node is the same or substantially the same as the illustrative components appearing in hardware and software layer 60 of FIG. 2 and/or the cloud computing nodes 10 of FIG. 1. Hereinafter, the illustrative components appearing in hardware and software layer 60 of FIG. 2 and/or the cloud computing nodes 10 of FIG. 1 will collectively be referred to as an illustrative management node 300. However, it should be understood that management node 300 is not limited exclusively to the aforementioned examples. Rather, the management node 300 can, in some embodiments, comprise components appearing in other aspects of FIG. 1 and FIG. 2 where the alternative component can benefit from establishing a trust relationship with one or more similar or dissimilar components.

In various embodiments, the management node 300 includes a memory 325, storage 330, an interconnect (e.g., BUS) 320, one or more processors (e.g., CPUs) 305, an I/O device interface 310, I/O devices 312, and a network interface 315.

Each CPU 305 retrieves and executes programming instructions stored in the memory 325 or storage 330. The interconnect 320 is used to move data, such as programming instructions, between the CPU 305, I/O device interface 310, storage 330, network interface 315, and memory 325. The interconnect 320 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices connected to the management node 300 via the I/O devices 312 or a communication network via the network interface 315.

In some embodiments, the memory 325 stores trust establishment instructions 328 and the storage 330 stores the shared file storage system 334. However, in various embodiments, the trust establishment instructions 328 and the shared file storage system 334 are stored partially in memory 325 and partially in storage 330, or they are stored entirely in memory 325 or entirely in storage 330, or they are accessed over a network via the network interface 315.

Figure 4:
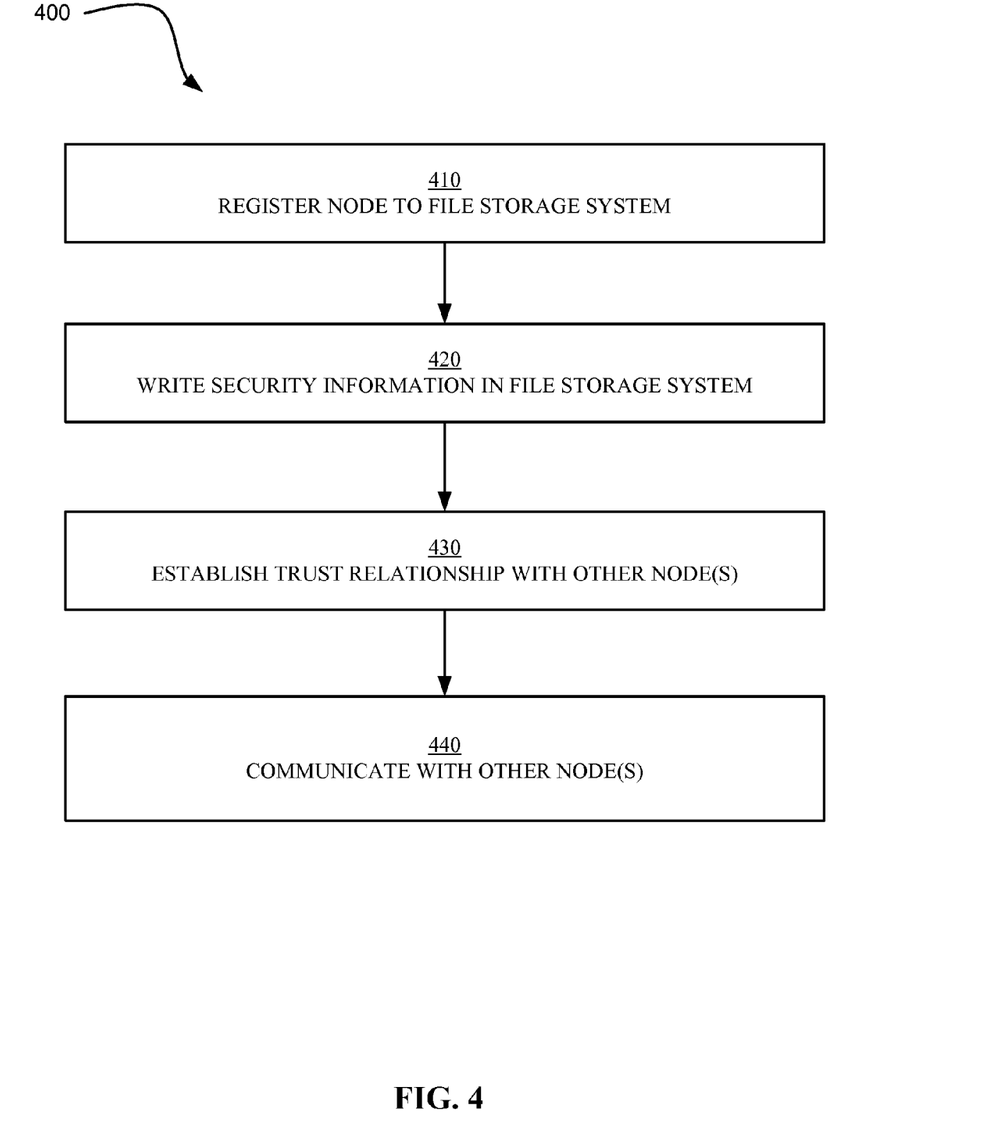
FIG. 4 illustrates a flowchart of an example method of establishing trust relationships with existing components according to some embodiments of the present disclosure.
Figure 5:
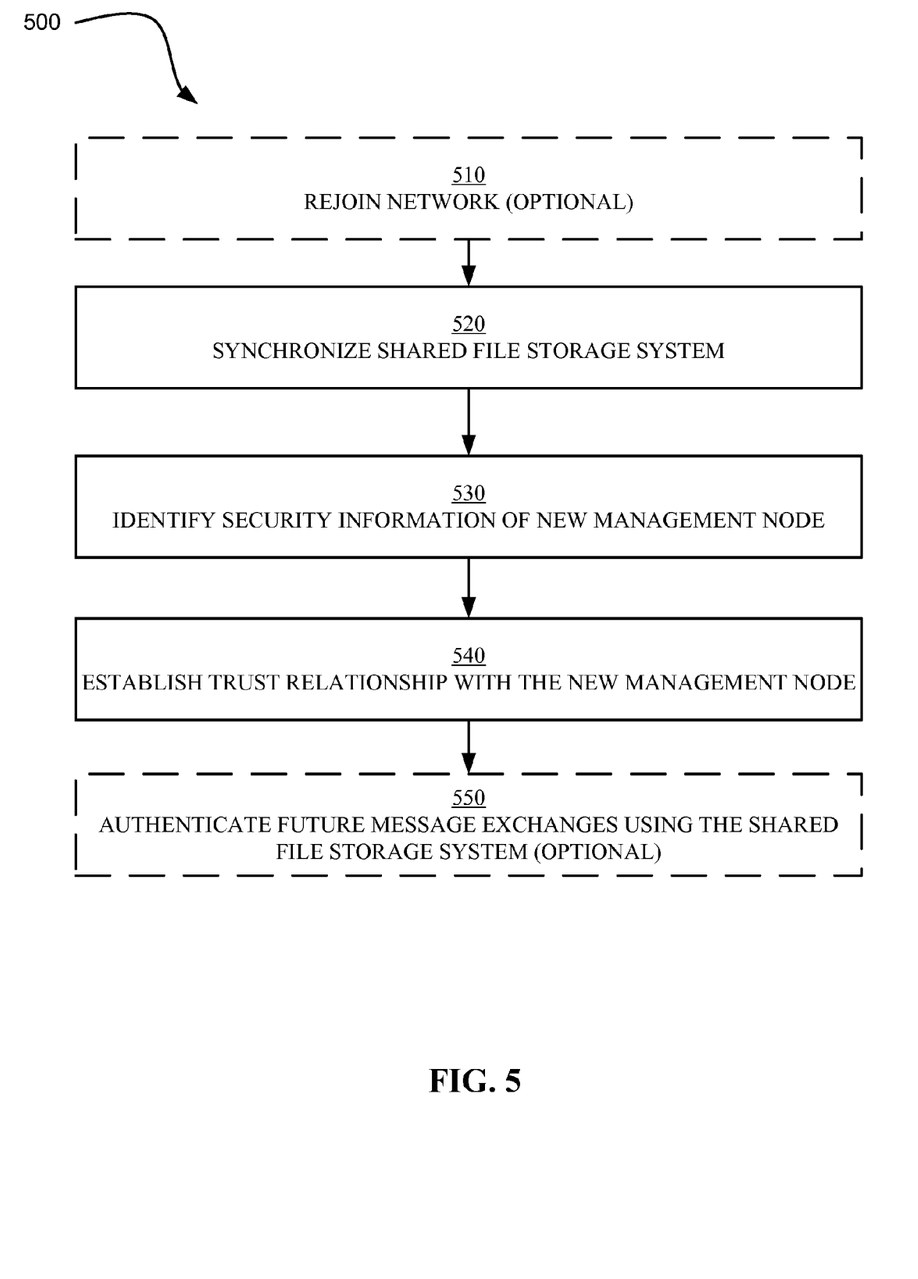
FIG. 5 illustrates a flowchart of an example method of identifying and establishing a trust relationship with a new network component according to some embodiments of the present disclosure.
Figure 6:
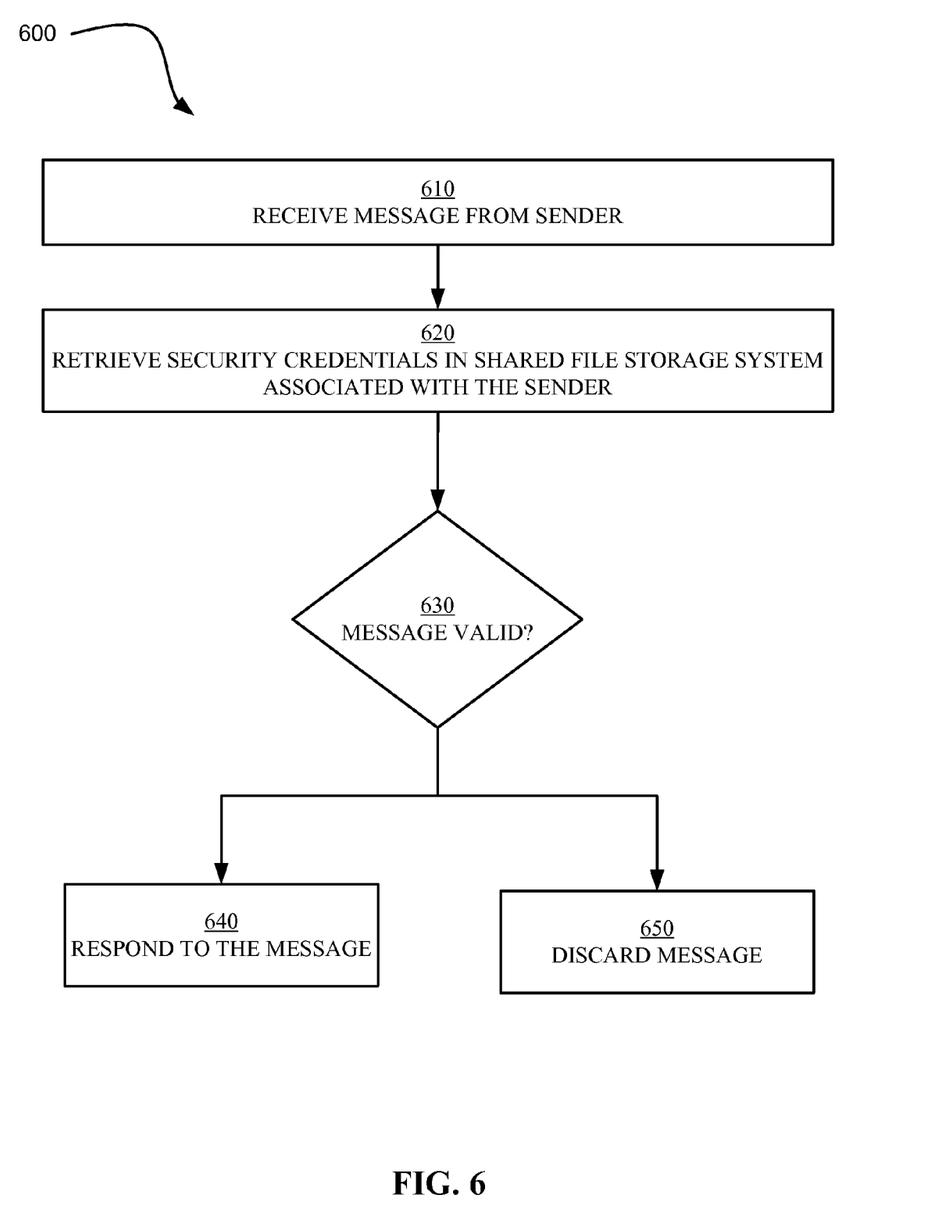
FIG. 6 illustrates a flowchart of an example method of authenticating message exchanges according to some embodiments of the present disclosure.

The trust establishment instructions 328 (also referred to herein as instructions 328) can store processor executable instructions for various methods such as the methods shown and described with respect to FIG. 4-6. The shared file storage system 334 can also be referred to as a synchronized file storage herein. The shared file storage system 334 can be, for example, a GPFS. In some embodiments the shared file storage system 334 contains security information 336. The security information 336 can include certificates of authority (e.g., X.509 certificates), public keys (e.g., public RSA keys), and/or security tokens of each management node, rack, or component registered to the file storage system 334.

In various embodiments, the I/O devices 312 can include an interface capable of presenting information and receiving input. In some embodiments, the I/O devices 312 can receive input that can modify aspects of the shared file storage system 334. For example, the set of security information 336 can be modified by adding security information or removing security information based on inputs from the I/O devices 312. In such cases, adding security information can be associated with initiating trust relationships between a new management node and existing management nodes, while removing information can be associated with revoking trust relationships between existing management nodes. In addition to an interface, the I/O devices 312 can further comprise additional computing components such as servers, blades, network components, networking devices, storage devices, or other computing components. The additional computing components can likewise be connected via a physical or virtual network via the network interface 315. A respective set of computing components in addition to a respective management node can comprise a rack according to some embodiments of the present disclosure.

Referring now to FIG. 4, shown is a flowchart for an example method 400 of establishing a trust relationship between one or more components of a network and a newly added component according to some embodiments of the present disclosure. The method 400 can be implemented by the newly added component. In some embodiments, the method 400 is executed by a processor (e.g., processor 305 of FIG. 3) according to a set of instructions (e.g., instructions 328 of FIG. 3). In some embodiments, the respective components described with respect to the method 400 comprise respective management nodes associated with respective sets of computing devices to form respective racks. The method 400 can begin with operation 410 with a new management node being registered to the file storage (e.g., shared file storage system 334 of FIG. 3). In some embodiments, registration to the file storage is provided via inputs received from an interface (e.g., I/O device 312 of FIG. 3). Operation 410 can further comprise the new management node allocating a portion of storage (e.g., storage 330 of FIG. 3) to be dedicated to the file storage. In some embodiments, the registration of the new management node with the file storage comprises an exchange of public keys (e.g., RSA public keys) between the new management node and the file storage. Thus, in various embodiments, the registration of the new management node to the file storage comprises as establishment of a trust relationship between the new management node and the file storage.

In operation 420, the new management node can store its security information in the file storage (e.g., 334 of FIG. 3). The new management node can, for example, store a certificate of authority (e.g., X.509 certificate), a public key of a key cryptography pair (e.g., RSA public key), and/or one or more security tokens in the file storage in accordance with various embodiments of the present disclosure.

In operation 430, the new management node can establish a trust relationship with one or more other management nodes registered to the file storage. In various embodiments, a message exchange establishes the trust relationship. The message exchange can include issuing security tokens between a pair of management nodes. The security tokens can be based on the certificates of authority and/or the public keys of the respective management nodes. The security tokens can provide an expeditious method of verification for future message exchanges occurring between the pair of management nodes.

In operation 440, the new management node can communicate with the other management nodes registered to the file storage. In various embodiments, the operation 440 can include communicating messages which are encrypted and signed by a sending management node and decrypted and verified by a receiving management node using a security token, a public key, and/or a certificate of authority stored in the shared file storage.

In some embodiments, the establishment of a plurality of trust relationships automatically propagates throughout the network of registered management nodes, while in alternative embodiments the propagation occurs on an as-needed basis. When the propagation occurs on an as-needed basis, the trust establishment process can initiate upon a first message exchange between two management nodes which do not have an existing trust relationship. In some embodiments, the message exchange is in the form of a HTTP message. For example, if a management node B receives a request for information from a new management node A, management node B can access the file storage and authenticate the integrity of management node A's request by viewing the stored security information of management node A.

In alternative embodiments, the propagation is automatically initiated for each available (e.g., online) management node associated with the shared file storage system (i.e., the propagation is "pushed" throughout the network by notifications of changes made to the shared file storage system). For example, management node B can receive a notification that new information has been added to the shared file storage system associated with a new management node X, and, in response to receiving the notification, management node B can initiate a message exchange between itself and the new management node X leading to establishment of a trust relationship using the security credentials of each management node which are stored in the file storage. In alternative cases, a management node A can trust a management node C if management node A trusts a management node B and management node B trusts management node C.

It is to be understood that although the method 400 is shown occurring in serial fashion, alternative paths are possible. For example, operations 420 and 430 can occur simultaneously, or, alternatively, operation 430 can occur before operation 420.

Thus, according to various trust relationship establishment protocols, the registration of a new management node to a shared file storage system as described by the method 400 can result in one or more messages automatically sent by the new management node, one or more messages automatically received by the new management node from at least a portion of the management nodes registered to the file storage, or one or more messages sent and/or received on an as-needed basis, all of which can initiate or finalize the formation of a trust relationship using the file storage in accordance with various embodiments of the present disclosure.

Referring now to FIG. 5, shown is a flowchart of an example method 500 of an existing management node identifying and establishing a trust relationship with a new management node according to some embodiments of the present disclosure. For the purposes of the present disclosure, an existing management node refers to a management node being registered to a shared file storage system and having existing trust relationships with one or more other management nodes registered to the file storage. In various embodiments, the method 500 can be executed by a processor (e.g., processor 305 of FIG. 3) executing instructions (e.g., instructions 328 of FIG. 3). The method 500 can begin with operation 510 (shown as optional via the dotted box) when an existing management node rejoins the network following an offline event. For example, an offline event could involve a management node shutting down or being otherwise temporarily disconnected from the network for maintenance, security, or other reasons. Thus, some embodiments of the present disclosure allow for management nodes which are not available during the initial registration of a new management node to the file storage to nonetheless automatically establish a trust relationship with the new management node upon returning to an available state.

In operation 520, the existing management node synchronizes its file storage with the shared file storage system. As a result of the synchronization, the existing management node can evaluate the file storage for updates. Thus, in some embodiments where operation 510 (i.e., re-connecting to the network following an offline event) does not occur, operation 520 can include monitoring the shared file storage system approximately continuously, at predetermined intervals, or monitoring received messages regarding status changes to the shared file storage system. In operation 530, the existing management node can identify new security information associated with a new management node.

Following identification of the new management node, the existing management node can establish a trust relationship with the new management node in operation 540. Operation 540 can include exchanging one or more of a certificate of authority, a public key, and/or a security token in various embodiments using the shared file storage system. In operation 550, shown as optional via the dotted box, future message exchanges can be authenticated using the information contained in the shared file storage system.

Thus, as shown and described with reference to FIG. 5, some embodiments of the present disclosure allow existing management nodes to establish trust relationships with management nodes newly registered to the file storage based on updated information stored in the file storage (e.g., shared file storage 334 of FIG. 3).

Referring now to FIG. 6, shown is a flowchart of a method 600 of authenticating message exchanges according to some embodiments of the present disclosure. In some embodiments, the method 600 is executed by one or more processors (e.g., processor 305 of FIG. 3) based on a set of instructions (e.g., instructions 328 of FIG. 3). The method 600 can begin with operation 610 when a first registered management node receives a request from a sender, which could be, for example, a second registered management node. In some embodiments, the request is sent in the form of a HTTP message. In operation 620, the first registered management node can retrieve the security information of the second registered management node which is stored in the shared file storage system. Operation 620 can include viewing a certificate of authority (e.g., X.509 certificate), viewing a public key (e.g., RSA key), and/or viewing one or more security tokens. In operation 630, the first registered management node can determine if the request from the second registered management node is valid based on the authentication of the stored security information. If the request from the second registered management node is valid, the method 600 can proceed to operation 640 and the first registered management node can respond to the request from the second registered management node. If the request from the second registered management node is invalid, the method 600 can proceed to operation 650 and discard the message. In various embodiments, operation 630 determines a request is invalid due to, for example, absence of appropriate security credentials stored in the shared file storage system, incorrectness of security credentials, expiration of the security credentials, or revocation of the security credentials.

Although the method 600 is above described with reference to two registered management nodes, the method 600 is also relevant, in some embodiments, to a message exchange between a registered management node and a newly registered management node. As demonstrated by the method 600, the present disclosure provides expeditious and robust authentication of message exchanges occurring between two or more components in a multi-component network according to some embodiments of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    registering a first management node to a shared file storage system;
        wherein the registering causes the first management node to be a trusted member of the shared file storage system;
        wherein the shared file storage system is replicated across a plurality of registered management nodes via a network;
        wherein each respective registered management node is associated with one or more computing devices to form a rack;
    writing, by the first management node to the shared file storage system, a public key and a certificate of authority of the first management node such that each respective registered management node can validate an authenticity of a message from the first management node using the public key and the certificate of authority of the first management node;
    issuing, by the first management node, a first security token to at least a second registered management node based on accessing a respective public key and a respective certificate of authority in the shared file storage system of the second registered management node, wherein the issuing a first security token further comprises:
        sending a message containing the first security token from the first management node to the second registered management node;
        validating, at the second registered management node, an authenticity of the first security token using a respective public key of the first management node stored in the shared file storage system;
        sending a request from the second registered management node to the first management node using the first security token, wherein the first security token indicates to the first management node that the second registered management node is a trusted management node;
    issuing, by the second registered management node, a second security token to at least the first management node, wherein issuing a second security token further comprises;
        sending a message containing the second security token from the second registered management to the first management node;
        validating, at the first management node, an authenticity of the second security token using a respective public key of the second registered management node stored in the shared file storage system;

sending a request from the first management node to the second registered management node using the second security token, wherein the second security token indicates to the second registered management node that the first management node is a trusted management node; and establishing, based on issuing the first security token and issuing the second security token, a mutual trust relationship between the first management node and the second registered management node.

2. The method of claim 1, wherein the registering causes the first management node to be a trusted member of the plurality of registered management nodes.

3. The method of claim 1, wherein the certificate of authority comprises a X.509 certificate, wherein the public key comprises a public RSA key, wherein the shared file storage system comprises a General Parallel File System (GPFS).

4. The method of claim 3, wherein the registering a first management node to a shared file storage system further comprises:

sending to the shared file storage system a RSA key associated with the first management node; and receiving, by the first management node and from the shared file storage system, a RSA key associated with the shared file storage system.

5. The method of claim 1, further comprising:

receiving a message by the first management node and from a third management node being registered to the shared file storage system;

retrieving, from the shared file storage system, a public key and a certificate of authority of the third management node by the first management node;

authenticating the message by the first management node, wherein the authentication is based on the public key and the certificate of authority of the third management node retrieved from the shared file storage system; and responding, based on authenticating the message, to the message by the first management node to the third management node.

6. The method of claim 1, further comprising:

synchronizing the shared file storage system stored on the first management node with the shared file storage system replicated across the plurality of registered management nodes;

identifying, in response to the synchronizing, a certificate of authority and a public key stored in the shared file storage system associated with a new management node;

issuing, in response to identifying the certificate of authority and the public key of the new management node, a first security token to the new management node;

receiving, in response to issuing the first security token to the new management node, a second security token from the new management node; and wherein the first security token and the second security token establish a mutual trust relationship between the first management node and the new management node.

7. The method of claim 1, further comprising:

revoking a trust relationship associated with a selected management node, wherein the revoking comprises a modification to the certificate of authority and the public key of the selected management node stored in the shared file storage system.

8. A system comprising:

a synchronized file storage, wherein the synchronized file storage is accessible to a plurality of registered management nodes via a network, wherein the synchronized file storage stores a respective public key and a respective certificate of authority for each respective registered management node;

at least a first management node and a second management node of the plurality of registered management nodes, wherein each respective management node comprises a processor and a memory and is associated with a respective set of computing devices to form a respective rack;

a new management node not registered to the synchronized file storage, the new management node comprising a memory and a processor and a respective set of computing devices to form a respective rack, wherein the memory is configured to store authentication information, wherein the processor is configured to:

register the new management node to the synchronized file storage, wherein, as a result of registering the new management node to the synchronized file storage, the new management node is a trusted member of the synchronized file storage; and store, in response to registering the new management node to the synchronized file storage, a public key and a certificate of authority of the new management node in the synchronized file storage;

wherein the new management node can validate an authenticity of a message from a different management node of the plurality of registered management nodes using a respective public key and a respective certificate of authority of the different management node stored in the synchronized file storage;

issue a first security token to the first management node in response to viewing a respective public key and a respective certificate of authority of the first management node stored in the synchronized file storage;

wherein the new management node sends a message containing the first security token to the first management node;

wherein the first management node validates an authenticity of the first security token using the respective public key of the new management node stored in the synchronized file storage;

wherein the first management node sends a request to the new management node, wherein the request includes the first security token, wherein, as a result of sending the request and the first security token, the new management node responds to the request;

wherein a processor of the first management node is configured to:

issue a second security token to at least the new management node in response to viewing a respective public key and a respective certificate of authority of the new management node stored in the synchronized file storage;

wherein the first management node sends a message containing the second security token to the new management node;

wherein the new management node validates an authenticity of the second security token using the respective public key of the first management node stored in the synchronized file storage;

wherein the new management node sends a request to the first management node, wherein the request includes the second security token, wherein, as a result of sending the request and the second security token, the first management node responds to the request; and wherein, in response to issuing the first security token and issuing the second security token, a mutual trust relationship is established between the new management node and the first management node.

9. The system of claim 8, wherein as a result of registering the new management node to the synchronized file storage, the new management node is trusted by the plurality of registered management nodes.

10. The system of claim 8, wherein the public key comprises a public RSA key, and wherein the certificate of authority comprises a X.509 certificate, and wherein the synchronized file storage comprises a General Parallel File System (GPFS).

11. A computer program product comprising a computer readable storage medium having program instructions embodied therewith, the program instructions executable by a processor to cause the processor to:

register a first management node to a distributed file system;

wherein, as a result of registering the first management node to the distributed file system, the first management node is a trusted member of the distributed file system;

wherein the distributed file system is replicated across a plurality of registered management nodes;

wherein the distributed file system stores a respective public key and a respective certificate of authority of each respective registered management node;

wherein each respective registered management node is associated with a respective set of computing devices;

write a new set of information to the distributed file system, wherein the new set of information comprises a public key and a certificate of authority of the first management node; and wherein each respective registered management node can validate an authenticity of a message from the first management node using the respective public key and the respective certificate of authority of the first management node stored in the distributed file system;

issue a first security token to at least a second registered management node of the plurality of registered management nodes based on viewing a public key and a certificate of authority of the second registered management node stored in the distributed file system;

wherein the first management node sends a message containing the first security token from the first management node to the second registered management node;

wherein the second registered management node validates an authenticity of the first security token using the respective public key of the first management node;

wherein the second registered management node sends a request to the first management node using the first security token, wherein the first security token indicates that the second registered management node is a trusted management node;

receive a second security token from the second registered management node;

wherein the second registered management node sends a message containing the second security token to the first management node;

wherein the first management node validates an authenticity of the second security token using a respective public key of the second registered management node stored in the distributed file system;

wherein the first management node sends a request to the second registered management node using the second security token, wherein the second security token indicates to the second registered management node that the first management node is a trusted management node; and establish, based on the first security token and the second security token, a mutual trust relationship between the first management node and the second registered management node.

12. The computer program product of claim 11, wherein, as a result of registering the first management node to the distributed file system, the first management node is trusted by each management node of the plurality of registered management nodes.

13. The computer program product of claim 11, wherein the program instructions are further configured to cause the processor to:

retrieve, from the distributed file system and in response to a message received from a third management node being registered to the distributed file system, a public key and a certificate of authority of the third management node;

authenticate the message based on the public key and the certificate of authority of the third management node retrieved from the distributed file system; and respond to the message from the third management node in response to authenticating the message.

14. The computer program product of claim 11, wherein the certificate of authority comprises a X.509 certificate, and wherein the public key comprises a RSA public key, and wherein the distributed file system comprises a General Parallel File System (GPFS).

15. The computer program product of claim 14, wherein the program instructions configured to cause the processor to register a first management node to a distributed file system are further configured to further cause the processor to:

send a RSA key associated with the first management node to the distributed file system; and receive a RSA key associated with the distributed file system from the distributed file system.

* * * * *